(12) United States Patent
Li et al.

(10) Patent No.: US 12,523,911 B2
(45) Date of Patent: Jan. 13, 2026

(54) DISPLAY DEVICE

(71) Applicant: HKC CORPORATION LIMITED, Guangdong (CN)

(72) Inventors: Yao Li, Guangdong (CN); Tianjun Huang, Guangdong (CN); Zhonglin Cao, Guangdong (CN); Chuan Wu, Guangdong (CN); Lidan Ye, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 141 days.

(21) Appl. No.: 18/613,463

(22) Filed: Mar. 22, 2024

(65) Prior Publication Data

US 2024/0377689 A1    Nov. 14, 2024

(30) Foreign Application Priority Data

May 11, 2023  (CN) .......................... 202310526361.9

(51) Int. Cl.
*G02F 1/1368* (2006.01)
*G02F 1/1343* (2006.01)
*G02F 1/1347* (2006.01)

(52) U.S. Cl.
CPC ...... *G02F 1/1368* (2013.01); *G02F 1/134309* (2013.01); *G02F 1/1347* (2013.01)

(58) Field of Classification Search
CPC . G02F 1/1368; G02F 1/134309; G02F 1/1347
See application file for complete search history.

(56) References Cited

U.S. PATENT DOCUMENTS

| | | | |
|---|---|---|---|
| 4,819,038 | A | 4/1989 | Alt |
| 2002/0085147 | A1 | 7/2002 | Ko |
| 2008/0309598 | A1 | 12/2008 | Doane et al. |
| 2009/0322665 | A1* | 12/2009 | Yoshihara ............. G02F 1/1347 345/94 |

(Continued)

FOREIGN PATENT DOCUMENTS

| | | |
|---|---|---|
| CN | 1678949 A | 10/2005 |
| CN | 201145800 Y | 11/2008 |
| CN | 101493589 A | 7/2009 |

(Continued)

*Primary Examiner* — Nathanael R Briggs

(57) ABSTRACT

A display device including three sequentially stacked layers of cholesteric liquid crystal cell, where each layer of cholesteric liquid crystal cell includes a cholesteric liquid crystal layer and a first electrode layer and a second electrode layer arranged on two sides of the cholesteric liquid crystal layer respectively, the first electrode layer includes multiple first electrode strips, the second electrode layer includes multiple second electrode strip, along a thickness direction of the three layers of cholesteric liquid crystal cell, the first electrode strips from different first electrode layers are disposed one to one and electrically connected, and the second electrode strips from different second electrode layers are disposed one to one and connected in parallel; the display device further includes an array transistor layer, and each of the second electrode strips in the three layers of cholesteric liquid crystal cell is connected in series with the array transistor layer.

16 Claims, 3 Drawing Sheets

(56) References Cited

U.S. PATENT DOCUMENTS

2020/0174297 A1\* 6/2020 Lim .................. G02F 1/1347
2022/0308395 A1  9/2022 Hase et al.

FOREIGN PATENT DOCUMENTS

| | | |
|---|---|---|
| CN | 102162952 A | 8/2011 |
| CN | 102376243 A | 3/2012 |
| CN | 104280970 A | 1/2015 |
| CN | 107818968 A | 3/2018 |
| CN | 207216229 U | 4/2018 |
| CN | 110824801 A | 2/2020 |
| CN | 111354771 A | 6/2020 |
| CN | 116203769 A | 6/2023 |
| CN | 116419598 A | 7/2023 |
| KR | 20080022702 A | 3/2008 |
| KR | 20210012419 A | 2/2021 |

\* cited by examiner

DISPLAY DEVICE

CROSS-REFERENCE TO RELATED APPLICATIONS

This disclosure claims the benefit of Chinese Patent Application No. 202310526361.9, entitled DISPLAY DEVICE, which was filed with China National Intellectual Property Administration on May 11, 2023, and the entire contents of which are incorporated herein by reference.

TECHNICAL FIELD

The present disclosure relates to the technical field of display technology, in particular to a display device.

BACKGROUND

At present, the update and upgrade of display technology in the display industry is becoming more and more frequent. Lots and lots of LCD/OLED/Min LED and other types of products have been manufactured with different process flows. The characteristics of the products manufactured with different process flow are very different. And the characteristics of Thin Film Transistors (TFTs) manufactured with different process flows is a decisive factor affecting a display product. In order to verify the influence of new process flows on the characteristics of TFTs, more and more display device manufacturers are exploring and verifying new process flows.

In the prior art, the common way to verify the factors affecting the characteristics of a TFT is to make verification masks. Taking LCD as an example, the TFT characteristics will be directly reflected on the display screen, which requires the verification masks simultaneously contain Array substrate and CF (color filter) color resistance full film layer. And it is through the cooperation of the CF color resistance full film layer and the Array substrate that a color screen can be displayed, so as to realize the TFT characteristics verification function. In case where the TFT characteristics of an OLED is to be verified, the verification masks should contain Array substrate and organic light-emitting layer full film layer, and it is through the cooperation of the Array substrate and the organic light-emitting layer full film layer that a color screen can be displayed, so as to realize the TFT characteristics verification function. In summary, due to the fact that currently respective verification masks must be designed and prepared for the respective display products, the manufacturers need to pay a higher verification cost, and the resources are wasted. In view of this, there is an urgent need to improve the existing TFT characteristics verification device.

SUMMARY

In view of the above, the technical solution applied in the disclosure is: providing a display device including three sequentially stacked layers of cholesteric liquid crystal cell, where each layer of cholesteric liquid crystal cell includes a cholesteric liquid crystal layer, and a first electrode layer and a second electrode layer arranged on two sides of the cholesteric liquid crystal layer respectively, the first electrode layer includes at least one first electrode strip extending in a first direction, the second electrode layer includes at least one second electrode strip extending in a second direction, and the first direction intersects the second direction; colors of the cholesteric liquid crystal layers in the three layers of cholesteric liquid crystal cell are red, green, and blue, respectively; along a thickness direction of the three layers of cholesteric liquid crystal cell, the first electrode strips from different first electrode layers are disposed one to one and electrically connected, and the second electrode strips from different second electrode layers are disposed one to one and connected in parallel; the display device further includes an array transistor layer, a cholesteric liquid crystal cell located at a first position in the three layers of cholesteric liquid crystal cell is a first cholesteric liquid crystal cell, the second electrode layer in the first cholesteric liquid crystal cell is arranged on the array transistor layer, and each of the second electrode strips in the three layers of cholesteric liquid crystal cell is connected in series with the array transistor layer.

Optionally, along the thickness direction of the three layers of cholesteric liquid crystal cell, projections of the first electrode strips from different first electrode layers overlap, and projections of the second electrode strips from different second electrode layers overlap.

Optionally, a first substrate is arranged between two adjacent layers of cholesteric liquid crystal cell for separating them.

Optionally, a cholesteric liquid crystal cell located at a last position in the three layers of cholesteric liquid crystal cell is a second cholesteric liquid crystal cell, a second substrate covers a side of the second cholesteric liquid crystal cell away from the other cholesteric liquid crystal cells, and a light-shading layer covers a side of the second substrate away from the second cholesteric liquid crystal cell.

Optionally, the first cholesteric liquid crystal cell further includes a light-absorbing layer located between the cholesteric liquid crystal layer and the second electrode layer and a third substrate located between the light-absorbing layer and the second electrode layer.

Optionally, the third substrate includes an organic film layer and inorganic film layers arranged on both side of the organic film layer.

Optionally, thickness of the third substrate is 10 μm to 14 μm.

Optionally, in a single cholesteric liquid crystal cell, a first alignment film is disposed between the cholesteric liquid crystal layer and the first electrode layer, and a second alignment film is disposed between the cholesteric liquid crystal layer and the second electrode layer.

Optionally, length of the cholesteric liquid crystal layer is less than length of the first electrode layer and less than length of the second electrode layer, the cholesteric liquid crystal layer is located at a middle portion of the first electrode layer and the second electrode layer, and sandwiched between the first electrode layer and the second electrode layer is an edge sealant adhesive layer which is located at both ends of the cholesteric liquid crystal layer.

Optionally, the first electrode strips and the second electrode strips are all light-permeable electrodes; and/or, the first direction and the second direction are perpendicular to each other.

Optionally, the second electrode strip in the first cholesteric liquid crystal cell is made of corrosion-resistant conductive material.

Optionally, the corrosion-resistant conductive material includes one or more of indium tin oxide, graphite, nickel-based alloys, titanium alloys, carbon fibers.

The display device provided in the disclosure has the following beneficial effects: compared with the prior art, the display device provided in the disclosure includes three layers of cholesteric liquid crystal cell, a first electrode layer and a second electrode layer are disposed at two sides of each cholesteric liquid crystal cell; the first electrode layer includes at least one first electrode strip extending along a first direction, and a signal COM may be input through the first electrode strip; the second electrode layer includes at least one second electrode strip extending in a second direction, and the voltage necessary for display may be supplied through the second electrode strip; the first electrode strips from different first electrode layers are disposed one to one and electrically connected, the second electrode strips from different second electrode layers are disposed one to one and connected in parallel, and each of the second electrode strips in the three layers of cholesteric liquid crystal cell is connected in series with the array transistor layer; by input a voltage to the second electrode strips through the array transistor layer, an electric field may be generated in an overlapping region of the first electrode strips and the second electrode strips, so that the cholesteric liquid crystals reflect circularly polarized light with same direction as its own spiral structure, so as to display a screen; red, green and blue cholesteric liquid crystal layers are respectively disposed in the three layers of cholesteric liquid crystal cell, a color screen may be displayed through overlaying the three colors, and the characteristics of the array transistor layer may be verified by observing the color screen. The display device provided in the disclosure allows verification of the characteristics of the thin film transistors in LCD, OLED and other display panels, without corresponding verification device designed and manufactured for each display product separately, which reduces verification costs and saves resources.

BRIEF DESCRIPTION OF THE DRAWINGS

In order to more clearly illustrate the technical solutions in the embodiments of the disclosure, the following provides a brief description of the accompanying drawings necessary in the embodiments or in the prior art. Obviously, the accompanying drawings described below are merely some embodiments of the disclosure. It is possible for those skilled in the art to obtain other drawings according to these accompanying drawings without paying creative labor.

Figure 1:
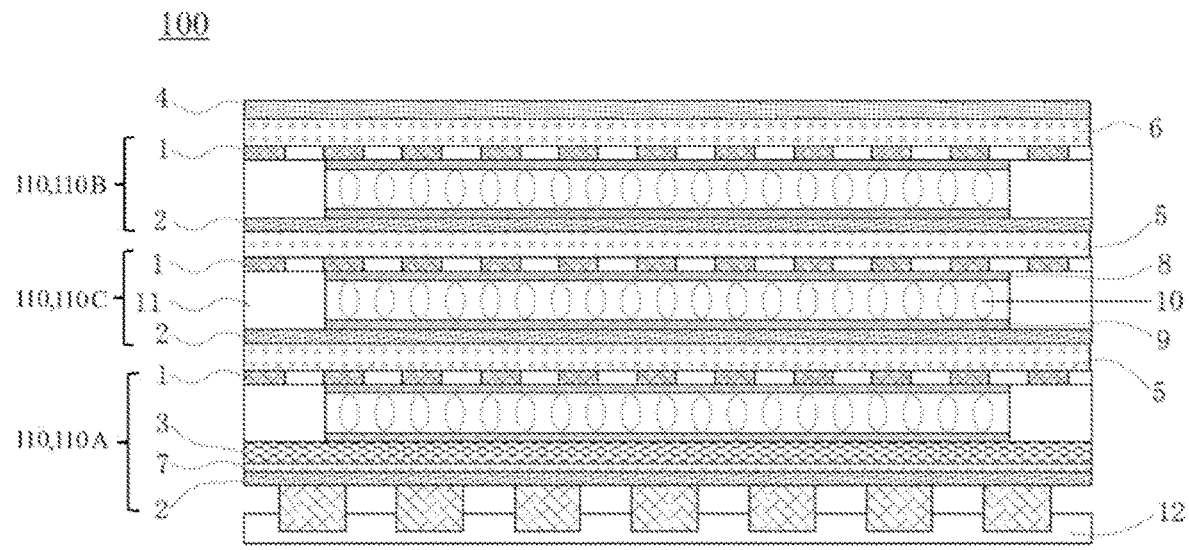
FIG. 1 is a schematic structure diagram of the display device provided in the embodiments of the disclosure.

In which, the reference numbers in the drawings are as follows: display device 100; cholesteric liquid crystal layer 110; first display device cholesteric liquid crystal layer 110A; second display device cholesteric liquid crystal layer 110B; third display device cholesteric liquid crystal layer 110C; first electrode layer 1; first electrode strip 101; second electrode layer 2; second electrode strip 201; light-absorbing layer 3; light-shading layer 4; first substrate 5; second substrate 6; third substrate 7; inorganic film layers 7A; organic film layer 7B; first alignment film 8; second alignment film 9; cholesteric liquid crystal layer 10; edge sealant adhesive layer 11; array transistor layer 12; thin film transistor 13; display unit 14.

DETAILED DESCRIPTION OF THE EMBODIMENTS

To make the technical problems to be solved, technical solutions and beneficial effects of this disclosure clearer, the disclosure is further described in detail in combination with the accompanying drawings and embodiments. It should be understood that the specific embodiments described herein are intended only to explain this disclosure rather than limit the disclosure.

It should be noted that when an element is said to be "fixed at" or "disposed at" another element, it may be directly on the another element or indirectly on the another element. When an element is said to be "connected to" another element, it may be directly connected to the another element or indirectly connected to the another element.

It is understood that the orientation or positional relationship indicated by the terms "length", "width", "upper", "lower", "front", "back", "left", "right", "vertical", "horizontal", "top", "bottom", "inside", "outside", etc. are based on the orientation or positional relationship shown in the accompanying drawings, which are intended only to facilitate and simplify the description of the disclosure, not to indicate or imply that the device or element referred to must have a particular orientation, be constructed and operate in a particular orientation, and therefore are not to be construed as limiting the disclosure.

In addition, the terms "first", "second" are used only for description and are not to be construed as indicating or suggesting relative importance or implying the number of technical features indicated. Thus, a feature defined by "first" or "second" may explicitly or implicitly include one or more of the features. In the description of this disclosure, "multiple" means two or more unless otherwise expressly specified.

Figure 2:
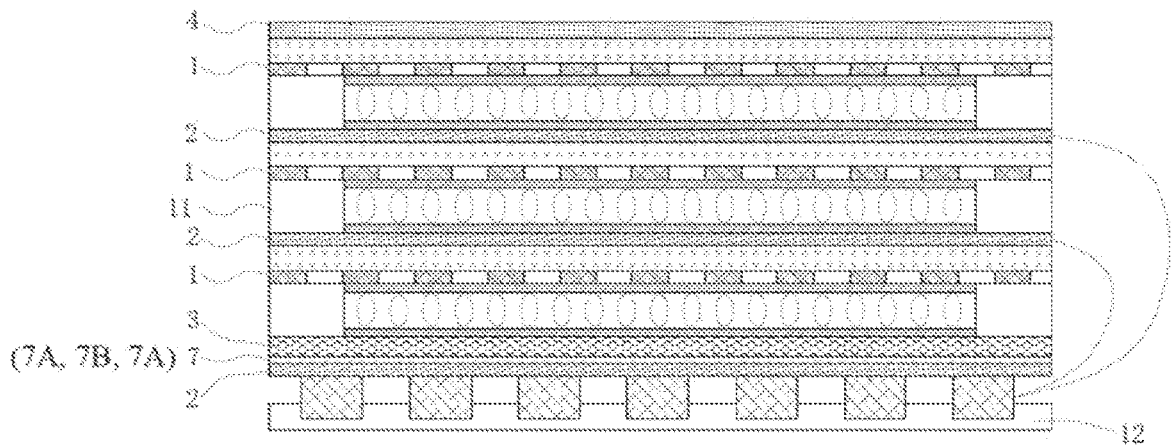
FIG. 2 is a schematic diagram showing the circuit connections of the display device provided in the embodiments of the disclosure.
Figure 3:
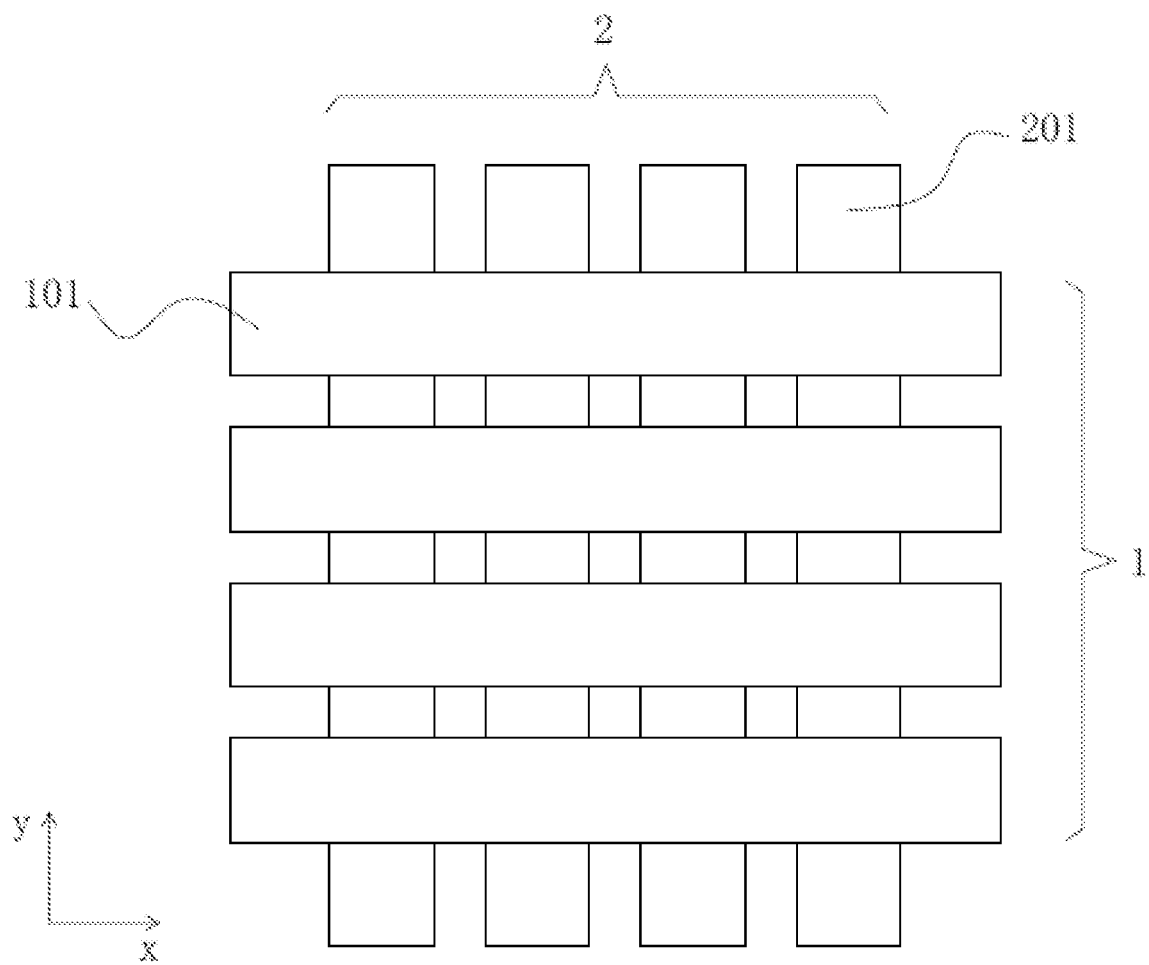
FIG. 3 is a schematic diagram showing the in-plane positions of the first electrode layer and the second electrode layer of the display device provided in the embodiments of the disclosure.

Please refer to FIG. 1-FIG. 3. FIG. 1 is a schematic structure diagram of the display device provided in the embodiments of the disclosure, FIG. 2 is a schematic diagram showing the circuit connections of the display device provided in the embodiments of the disclosure, and FIG. 3 is a schematic diagram showing the in-plane positions of the first electrode layer and the second electrode layer of the display device provided in the embodiments of the disclosure. Now the display device provided in the embodiments of the disclosure is to be described.

The embodiments of the disclosure provide a display device 100, as shown in FIG. 1, which includes three sequentially stacked layers of cholesteric liquid crystal cell 110. Each layer of cholesteric liquid crystal cell includes a cholesteric liquid crystal layer 10, and a first electrode layer 1 and a second electrode layer 2 arranged on the two sides of the cholesteric liquid crystal layer 10 respectively. Referring to FIG. 3, the first electrode layer 1 includes at least one first electrode strip 101 extending in a first direction, the second electrode layer 2 includes at least one second electrode strip 201 extending in a second direction, and the first direction intersects the second direction. The colors of the cholesteric liquid crystal layers 10 in the three layers of cholesteric liquid crystal cell are red, green, and blue, respectively. Along the thickness direction of the three layers of cholesteric liquid crystal cell, the first electrode strips 101 from different first electrode layers 1 are disposed one to one and electrically connected, and the second electrode strips 201 from different second electrode layers 2 are disposed one to one and connected in parallel. Referring to FIG. 2, the display device also includes an array transistor layer 12. The cholesteric liquid crystal cell located at a first position in the three layers of cholesteric liquid crystal cell is a first cholesteric liquid crystal cell 110A, that is, the first cholesteric liquid crystal cell refers to the cholesteric liquid crystal cell closest to the array transistor layer 12. The second electrode layer 2 in the first cholesteric liquid crystal cell is arranged on the array transistor layer 12, and the second electrode strips 201 in the three layers of cholesteric liquid crystal cell are respectively connected with the array transistor layer 12 in series.

Each layer of cholesteric liquid crystal cell includes a cholesteric liquid crystal layer 10, and the cholesteric liquid crystal layer 10 is composed of multiple cholesteric liquid crystals arranged in a layer. The cholesteric liquid crystals are flat, and the molecules in layers are parallel to each other with the molecular long axis parallel to the layers' plane. The directions of the molecular long axis of different layers change slightly, and give a spiral structure along the normal direction of the layers. The pitch of the cholesteric liquid crystals is about 300 nm, which is of the same order as the wavelength of visible light, and the pitch will change with the different external temperature and electric field conditions. Therefore, it is possible to modulate the external light by adjusting the pitch. The cholesteric liquid crystals can selectively reflect circularly polarized light with same direction as its own spiral structure. According to Bragg's reflection law, λ=np (where n is the average refractive index of the liquid crystal matrix, A is the reflected light wavelength, p is the pitch), the reflected light wavelength λ is directly related to the pitch p. When the reflected light wavelength 2 is within the visible wavelength range, bright structural colors can be observed. Since the first direction intersects the second direction, the first electrode strip 101 and the second electrode strip 201 have at least one overlapping region in the thickness direction of the three layers of cholesteric liquid crystal cell. Along the thickness direction of the three layers of cholesteric liquid crystal cell, the first electrode strips 101 from the different first electrode layers 1 are disposed one to one and electrically connected. The signal COM may be input through the first electrode strips 101. Along the thickness direction of the three layers of cholesteric liquid crystal cell, the second electrode stripes 201 from the different second electrode layers 2 are disposed one to one and connected in parallel, and the second electrode stripes 201 in the three layers of cholesteric liquid crystal cell are respectively connected with the array transistor layer 12 in series. The second electrode strips 201 act as pixel electrodes. The array transistor layer 12 may supply the required voltage for display through the second electrode strips 201, to allow the overlapping regions of the first electrode strips 101 and the second electrode strips 201 generate an electric field, such that the cholesteric liquid crystals reflect the circularly polarized light with the same direction as its own spiral structure, so as to display a screen. The red, green and blue cholesteric liquid crystal layer 10 are respectively arranged in the three layers of cholesteric liquid crystal cell, and a color screen can be displayed through overlaying the three colors. The characteristics of the array transistor layer 12 can be verified by observing the color screen. The display device provided in the disclosure only needs to have the second electrode layer 2 in the first cholesteric liquid crystal cell, which is located at the first position among the three layers of cholesteric liquid crystal cell, disposed on the array transistor layer 12, and the second electrode strips 201 in the three layers cholesteric liquid crystal cell connected in series with the array transistor layer 12, to allow the characteristics of the array transistor layer 12 to be verified. Different array transistor layer 12 can be used with the same three layers of cholesteric liquid crystal cell, so the display device provided in the disclosure may allow verification of the characteristics of different thin film transistors in LCD, OLED and other display panels, without corresponding verification device designed and manufactured for each display product separately, which saves resources and reduces verification costs. The first electrode layer 1 includes at least one first electrode strip 101 extending in the first direction, that is, the first electrode layer 1 may include one first electrode strip 101 or may include multiple first electrode strips 101. In case where there are multiple first electrode strips 101 in one same first electrode layer 1, the multiple first electrode strips 101 are spaced and disposed separately. The second electrode layer 2 includes at least one second electrode strip 201 extending in the second direction, that is, the second electrode layer 2 may include one second electrode strip 201 or may include multiple second electrode strips 201. In case where there are multiple second electrode strips 201 in one same second electrode layer 2, the second electrode strips 201 are spaced and disposed separately.

In some embodiments of the disclosure, referring to FIG. 3, the first electrode strips 101 and the second electrode strips 201 are both elongated strips with a width of micrometers. There are multiple first electrode strips 101 and multiple second electrode strips 201. The multiple first electrode strips 101 are parallelly spaced and disposed and form the first electrode layer 1, and the multiple second electrode strips 201 are parallelly spaced and disposed and form the second electrode layer 2.

The first direction intersects the second direction, that is, the first electrode strip 101 extending in the first direction and the second electrode strip 201 extending in the second direction will have an overlapping region, which are the overlapped parts of their projections in the normal direction of the first electrode layer 1 and the second electrode layer 2. It is understood that there is at least one overlapping region. Optionally, the first electrode strip 101 and the second electrode strip 201 are spatially interleaved. Optionally, the first direction is perpendicular to the second direction. As an example, the first direction refers to the direction X shown in FIG. 3, and the first electrode strips 101 extend in the direction X. The second direction refers to the direction Y shown in FIG. 3, and the second electrode strips 201 extend in the direction Y.

In some embodiments of the disclosure, the multiple first electrode strips 101 and the multiple second electrode strips 201 are equally spaced and parallelly disposed. In other embodiments of the disclosure, the multiple first electrode strips 101 and the multiple second electrode strips 201 may also not be equally spaced.

Along the thickness direction of the three layers of cholesteric liquid crystal cell, the first electrode strips 101 from the different first electrode layers 1 are disposed one to one and electrically connected, that is, the different first electrode layers 1 are the first electrode layers 1 in the different cholesteric liquid crystal cells, there are same number of first electrode strips 101 in the different first electrode layers 1, whose positions correspond to each other, the first electrode strips 1 in the same first electrode layer 1 are disposed separately, and the correspondingly positioned first electrode strips 101 from different first electrode layers 1 are arranged to be electrically connected. Here the electrical connection may be connection in series or in parallel. Along the thickness direction of the three layers of cholesteric liquid crystal cell, the second electrode strips 201 from the different second electrode layers 2 are disposed one to one and connected in parallel, that is, the different second electrode layers 2 are the second electrode layers 2 in the different cholesteric liquid crystal cells, there are same number of second electrode strips 201 in the different second electrode layers 2, whose positions correspond to each other, the second electrode strips 201 in the same second electrode layer 2 are disposed separately, and the correspondingly positioned second electrode strips 201 from different second electrode layers 2 are connected in parallel. In particular, the display device also includes the array transistor layer 12, and the second electrode strips 201 in the different second electrode layers 2 are respectively connected with the array transistor layer 12 in series.

In some embodiments of the disclosure, the first electrode strips 101 from different first electrode layers 1 are disposed one to one and connected in series with each other along the thickness direction of the three layers of cholesteric liquid crystal cell.

In other embodiments of the disclosure, the first electrode strips 101 from different first electrode layers 1 are disposed one to one and connected in parallel with each other along the thickness direction of the three layers of cholesteric liquid crystal cell.

In some embodiments of the disclosure, the first electrode strips 101 from different first electrode layers 1 are disposed one to one, that is, specifically, the projections of the first electrode strips 101 from different first electrode layers 1 overlap with each other in the thickness direction of the three layers of cholesteric liquid crystal cell. Similarly, the second electrode strips 201 from different second electrode layers 2 are disposed one to one, that is, specifically, the projections of the second electrode strips 201 from different second electrode layers 2 overlap with each other in the thickness direction of the three layers of cholesteric liquid crystal cell.

The colors of the cholesteric liquid crystal layers 10 of the three layers of cholesteric liquid crystal cell are red, green and blue, respectively. The order of the colors of the respective cholesteric liquid crystal layers 10 in the three layers cholesteric liquid crystal cell is not limited here.

Please refer to FIG. 1 or FIG. 2. In some embodiments of the disclosure, the three cholesteric liquid crystal cells 110 are respectively the first cholesteric liquid crystal cell 110A, the third cholesteric liquid crystal cell 110C and the second cholesteric liquid crystal cell 110B in the direction away from array transistor layer 12. A red cholesteric liquid crystal layer 10, a green cholesteric liquid crystal layer 10 and a blue cholesteric liquid crystal layer 10 are respectively disposed in the first cholesteric liquid crystal cell, the third cholesteric liquid crystal cell and the second cholesteric liquid crystal cell. Through the cholesteric liquid crystals of three colors, the color screen may be displayed, so that the characteristics of the thin film transistor 13 may be verified under various voltages.

In other embodiments of the disclosure, the positions of the red cholesteric liquid crystal layer 10, the green cholesteric liquid crystal layer 10, and the blue cholesteric liquid crystal layer 10 may be exchanged. For example, the green cholesteric liquid crystal layer 10 is disposed in the first cholesteric liquid crystal cell, the blue cholesteric liquid crystal layer 10 is disposed in the third cholesteric liquid crystal cell, and the red cholesteric liquid crystal layer 10 is disposed in the second cholesteric liquid crystal cell.

In other embodiments of the disclosure, the red cholesteric liquid crystal layer 10, the green cholesteric liquid crystal layer 10, and the blue cholesteric liquid crystal layer 10 may also be arranged in other order, which is not limited in the disclosure.

Please refer to FIG. 1 and FIG. 2. In some embodiments of the disclosure, a first substrate 5 is arranged between two adjacent layers of cholesteric liquid crystal cell for separating them.

In some embodiments of the disclosure, the first substrate 5 is a glass substrate. In other embodiments of the disclosure, the first substrate 5 may also be made of other material.

Please refer to FIG. 1 and FIG. 2. In some embodiments of the disclosure, the cholesteric liquid crystal cell located at a last position in the three layers of cholesteric liquid crystal cell is the second cholesteric liquid crystal cell, that is, the second cholesteric liquid crystal cell is the cholesteric liquid crystal cell away from the array transistor layer 12 (i.e., the uppermost liquid crystal cell in FIG. 1). A second substrate 6 covers the side of the second cholesteric liquid crystal cell away from the other cholesteric liquid crystal cells, and a light-shading layer 4 covers the side of the second substrate 6 away from the second cholesteric liquid crystal cell.

In some embodiments of the disclosure, the second substrate 6 is a glass substrate. In other embodiments of the disclosure, the second substrate 6 may also be made of other material.

Figure 4:
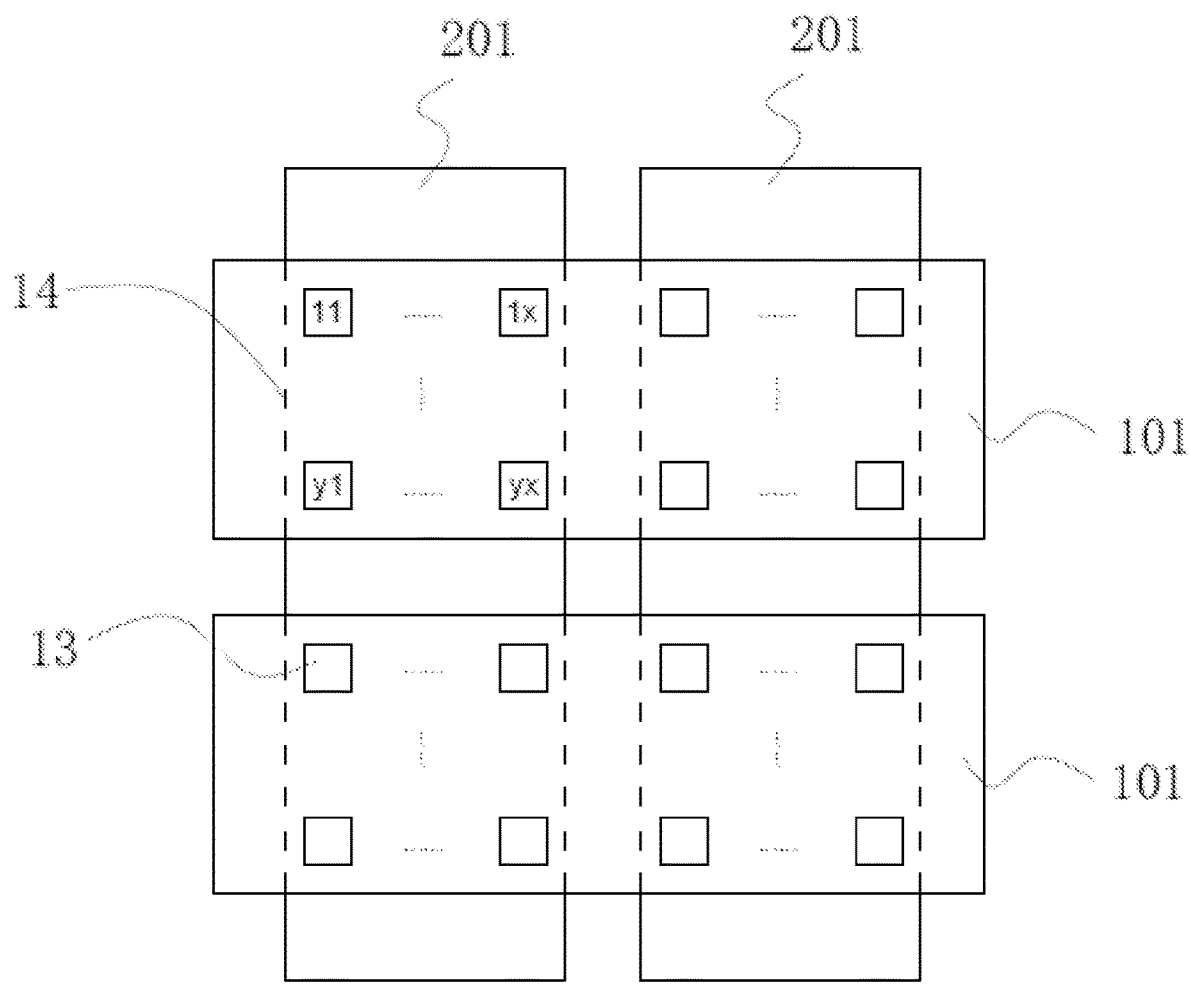
FIG. 4 is a schematic diagram showing the in-plane positions of the display device and the TFTs provided in the embodiments of the disclosure.

Please refer to FIG. 4, the overlapping regions of the first electrode strips 101 and the second electrode strips 201 constitute the display units 14. The region where the display units 14 are located is the display area of the cholesteric liquid crystal cell, and the remaining area is the non-display area of the cholesteric liquid crystal cell. The light-shading layer 4 is arranged at the non-display area on the side of the second cholesteric liquid crystal cell away from the first cholesteric liquid crystal cell. The light-shading layer 4 can prevent light leakage from the non-display area, avoiding the negative effect of a light leakage in the non-display area on the contrast and brightness of the display area from affecting the accuracy of TFT characteristics verification.

Please refer to FIG. 1 and FIG. 2. In some embodiments of the disclosure, the first cholesteric liquid crystal cell also includes a light-absorbing layer 3 located between the cholesteric liquid crystal layer 10 and the second electrode layer and a third substrate 7 located between the light-absorbing layer 3 and the second electrode layer 2. The light-absorbing layer 3 may absorb external light, and the absorbed external light is reflected through the cholesteric liquid crystals, thereby displaying the screen. Through the first substrate 5, the second substrate 6 and the third substrate 7, the cholesteric liquid crystals may be encapsulated inside the cholesteric liquid crystal cells, preventing leakage.

In some embodiments of the disclosure, the third substrate includes an organic film layer 7B and inorganic film layers 7A arranged on both side of the organic film layer.

In some embodiments of the disclosure, the organic film layer is made of acrylic. In other embodiments of the disclosure, the organic film layer may also be made of material such as epoxy resin, which is not limited in the disclosure. The organic film layer may be prepared by inkjet printing.

In some embodiments of the disclosure, the inorganic film layer may be made of silicon nitride. In other embodiments of the disclosure, the inorganic film layer may also be made of silicon oxide, silicon nitride and a stacked combination of the above materials, etc., which is not limited in the disclosure. The inorganic film layer may be prepared by chemical vapor deposition.

In some embodiments of the disclosure, the thickness of the third substrate 7 is 10 μm to 14 μm. Optionally, the thickness of the third substrate 7 is 10 μm, in which the thickness of the organic film layer is 8 μm and the thickness of the two inorganic film layers is 1 μm. In some other embodiments of the disclosure, the thickness of the third substrate 7 may also be 11 μm, 12 μm, 13 μm, 14 μm, etc., which is not limited in the disclosure.

The third substrate 7 is of the above material and thickness, which may reduce the influence of the third substrate 7 on the electric field strength, avoiding it from affecting the display effect.

Please refer to FIG. 1 and FIG. 2. In some embodiments of the disclosure, in a single cholesteric liquid crystal cell, a first alignment film 8 is disposed between the cholesteric liquid crystal layer 10 and the first electrode layer 1, and a second alignment film 9 is disposed between the cholesteric liquid crystal layer 10 and the second electrode layer 2. The first alignment film 8 and the second alignment film 9 are used to control the rotation of the liquid crystal molecules, and the liquid crystal molecules on the surfaces of the first alignment film 8 and the second alignment film 9 can only be aligned in a certain direction and regularly arranged. The first alignment film 8 and the second alignment film 9 may be prepared with polyimide films or other material, which is not limited in the disclosure.

Please refer to FIG. 1 and FIG. 2. In some embodiments of the disclosure, the length of the cholesteric liquid crystal layer 10 is less than the length of the first electrode layer 1 and less than the length of the second electrode layer 2. The cholesteric liquid crystal layer 10 is located at the middle portion of the first electrode layer 1 and the second electrode layer 2. Sandwiched between the first electrode layer 1 and the second electrode layer 2 is an edge sealant adhesive layer 11, which is located at both ends of the cholesteric liquid crystal layer 10. The edge sealant adhesive layer 11 is used to seal the edge of the cholesteric liquid crystal layer 10 to prevent the cholesteric liquid crystals from leaking.

Please refer to FIG. 4. Thin film transistors 13 arranged in an array are deposited on the array transistor layer 12. The signal COM is input through the first electrode strip 101 and connected to the thin film transistor 13 through the second electrode strip 201. The thin film transistor 13 provides a voltage to the second electrode strip 201, and an electric field is generated between the overlapping regions of the first electrode strip 101 and the second electrode strip 201. The three kinds of red, blue and green cholesteric liquid crystals selectively reflect the external light under the electric field, thus displaying the color screen. Through the displayed screen, it is possible to verify whether the characteristics of the thin film transistor 13 meet the requirements. For example, in case where it is expected that the screen portion will not display at the corresponding position of one or more thin film transistors 13, but after the second electrode layer 2 is connected with the thin film transistor 13, the screen portion displays, or in case where the screen portion expected to display does not display, it is determined that the characteristics of the drain of the thin film transistor 13 are abnormal. Or, in case where the screen portion expect to display a certain color shows another color, it is determined that the voltage input to the drain of the thin film transistor 13 is not the theoretical voltage, and there is an output abnormity of the thin film transistor 13.

Please refer to FIG. 3, which is a schematic diagram showing the in-plane positions of the first electrode layer 1 and the second electrode layer 2 of the display device provided in the embodiments of the disclosure. As shown in FIG. 3, the first electrode layer 1 includes m rows of first electrode strips 101, and the first electrode strips 101 extend in the first direction; the second electrode layer 2 includes n columns of second electrode strips 201, and the second electrode strips 201 extend in the second direction. The first electrode strips 101 are overlapped with the second electrode strips 201, and the first direction and the second direction form an angle therebetween. Since an electric field is generated only at an overlapping region of the first electrode strips 101 and the second electrode strips 201 to make the cholesteric liquid crystals to reflect external light, each overlapping region may form a display unit 14. The first electrode strips 101 are used to provide the signal COM and may be turned on row by row. The second electrode strips 201 provide the display voltage and may be turned on column by column. Therefore, the respective display units 14 may be turned on one by one by turning on the first electrode strips 101 row by row and the second electrode strips 201 column by column.

In some embodiments of the disclosure, the angle between the first direction and the second direction is 90°, that is, the first electrode strips 101 are perpendicular to the second electrode strips 201, such that the display unit 14 is rectangular in shape. In other embodiments of the disclosure, the first direction is not perpendicular to the second direction, but there is an angle therebetween, which may be 45°, 60°, etc., so that the shape of the formed display unit 14 may also be a parallelogram.

In some embodiments of the disclosure, the second electrode strips 201 (i.e., the electrodes used to connect the thin film transistors 13) in the first cholesteric liquid crystal cell are made of corrosion-resistant conductive material. Since the second electrode strips 201 in the first cholesteric liquid crystal cell need to be connected with the thin film transistors 13, they are prone to electrochemical corrosion, and by making the second electrode strips 201 in the first cholesteric liquid crystal cell with corrosion-resistant conductive material, the probability of electrochemical corrosion may be reduced, and the service life of the device may be prolonged.

In some embodiments of the disclosure, the corrosion-resistant conductive material of the second electrode strips 201 in the first cholesteric liquid crystal cell is Indium Tin Oxide (ITO). In other embodiments of the disclosure, the corrosion-resistant conductive material of the second electrode strips 201 in the first cholesteric liquid crystal cell may also be one or more of graphite, nickel-based alloys, titanium alloys, carbon fibers.

In some embodiments of the disclosure, except for the second electrode strips 201 in the first cholesteric liquid crystal cell, the other electrodes are light-permeable electrodes, so as to improve the contrast and brightness of the display device. The light-permeable electrodes may be made of one or more of indium tin oxide, carbon nanotubes, carbon nanorods, graphene, or may be light-permeable of other material, which are not limited in the disclosure.

In some embodiments of the disclosure, the second electrode strips 201 in the first cholesteric liquid crystal cell may also be light-permeable electrodes of, e.g. Indium tin oxide.

In some embodiments of the disclosure, as shown in FIG. 2, the second electrode layer 2 in the first cholesteric liquid crystal cell is in contact with the array transistor layer 12 to conduct electricity, and the second electrode strips 201 in the second and third cholesteric liquid crystal cells are respectively connected to the array transistor layer 12 through wires. This structure allows the second electrode layer 2 to be directly in contact with the array transistor layer 12 to provide the voltage required by the second electrode layer 2, which may reduce the wiring and improve the detection efficiency.

In other embodiments of the disclosure, it is also possible to connect the array transistor layer 12 to the second electrode strips 201 in the three layers of cholesteric liquid crystal cells respectively with wires to provide the voltages required by the second electrode layers 2.

Refer to FIG. 4, which is a schematic diagram showing the in-plane positions of the display device and the TFTs provided in the embodiments of the disclosure. On the array transistor layer 12 corresponding to each display unit 14, x columns and y rows of thin film transistors 13 are disposed correspondingly, that is, each display unit 14 corresponds to x*y thin film transistors 13. Therefore, each display unit 14 may verify the characteristics of the x*y thin film transistors 13. The density of the thin film transistors 13 on different array transistor layers 12 may be varied, therefore, the display device provided in the disclosure may be used to verify the characteristics of different array transistor layers 12. In case where the number of thin film transistors 13 on a unit area of the array transistor layer 12 is certain, it is possible to reduce the area of the display unit 14 (that is, to reduce the widths of the first electrode strips 101 and of the second electrode strips 201), to reduce the number of thin film transistors 13 corresponding to each display unit 14, so as to improve the accuracy and fineness of the display and improve the accuracy of the characteristics verification. Moreover, the display device provided in the embodiments of the disclosure is applicable to array transistor layers 12 of different sizes, provided that the thin film transistors 13 on the array transistor layers 12 can be connected with the second electrode layer 2 in the display device. Therefore, the same display device can be freely matched with array transistor layers 12 of different sizes, and thus can be reused to save resources.

The above describes only preferred embodiments of the disclosure and is not intended to limit the disclosure. Any modification, equivalent replacement and improvement made within the spirit and principle of the disclosure shall be included in the protection scope of the disclosure.

What is claimed is:

1. A display device, comprising three sequentially stacked layers of cholesteric liquid crystal cell, wherein
    each layer of cholesteric liquid crystal cell comprises a cholesteric liquid crystal layer, and a first electrode layer and a second electrode layer arranged on two sides of the cholesteric liquid crystal layer respectively; the first electrode layer comprises at least one first electrode strip which extends in a first direction and is used for supplying a signal COM to the cholesteric liquid crystal layer, the second electrode layer comprises at least one second electrode strip which extends in a second direction and is used for supplying a voltage to a corresponding cholesteric liquid crystal layer for rotation, and the first direction intersects the second direction; in each layer of cholesteric liquid crystal cell, an overlapping region of the first electrode strip and the second electrode strip constitutes a display unit;
    colors of the cholesteric liquid crystal layers in the three layers of cholesteric liquid crystal cell are red, green, and blue, respectively;
    along a thickness direction of the three layers of cholesteric liquid crystal cell, the first electrode strips from different first electrode layers are disposed one to one and electrically connected, and the second electrode strips from different second electrode layers are disposed one to one; and along the thickness direction of the three layers of cholesteric liquid crystal cell, three second electrode strips corresponding to the display unit are connected in parallel;
    along the thickness direction of the three layers of cholesteric liquid crystal cell, projections of the first electrode strips from different first electrode layers overlap, and projections of the second electrode strips from different second electrode layers overlap; and
    the display device further comprises an array transistor layer, a cholesteric liquid crystal cell located at a first position in the three layers of cholesteric liquid crystal cell is a first cholesteric liquid crystal cell, the second electrode layer in the first cholesteric liquid crystal cell is arranged on the array transistor layer, and each of the second electrode strips in the three layers of cholesteric liquid crystal cell is connected in series with a drain of the array transistor layer.

2. The display device according to claim 1, wherein a first substrate is arranged between two adjacent layers of cholesteric liquid crystal cell for separating the two adjacent layers of cholesteric liquid crystal cell.

3. The display device according to claim 1, wherein a cholesteric liquid crystal cell located at a last position in the three layers of cholesteric liquid crystal cell is a second cholesteric liquid crystal cell, a second substrate covers a side of the second cholesteric liquid crystal cell away from the other cholesteric liquid crystal cells, and a light-shading layer covers a side of the second substrate away from the second cholesteric liquid crystal cell.

4. The display device according to claim 1, wherein the first cholesteric liquid crystal cell further comprises a light-absorbing layer located between the cholesteric liquid crystal layer and the second electrode layer and a third substrate located between the light-absorbing layer and the second electrode layer.

5. The display device according to claim 4, wherein the third substrate comprises an organic film layer and inorganic film layers arranged on both side of the organic film layer; and/or, thickness of the third substrate is 10 μm to 14 μm.

6. The display device according to claim 1, wherein in a single cholesteric liquid crystal cell, a first alignment film is disposed between the cholesteric liquid crystal layer and the first electrode layer, and a second alignment film is disposed between the cholesteric liquid crystal layer and the second electrode layer.

7. The display device according to claim 1, wherein length of the cholesteric liquid crystal layer is less than length of the first electrode layer and less than length of the second electrode layer, the cholesteric liquid crystal layer is located at a middle portion of the first electrode layer and the second electrode layer, and sandwiched between the first electrode layer and the second electrode layer is an edge sealant adhesive layer which is located at both ends of the cholesteric liquid crystal layer.

8. The display device according to claim 1, wherein the first electrode strips and the second electrode strips are all light-permeable electrodes; and/or, the first direction and the second direction are perpendicular to each other.

9. The display device according to claim 1, wherein the second electrode strip in the first cholesteric liquid crystal cell is made of corrosion-resistant conductive material which comprises one or more of indium tin oxide, graphite, nickel-based alloys, titanium alloys, carbon fibers.

10. The display device according to claim 2, wherein the second electrode strip in the first cholesteric liquid crystal cell is made of corrosion-resistant conductive material which comprises one or more of indium tin oxide, graphite, nickel-based alloys, titanium alloys, carbon fibers.

11. The display device according to claim 3, wherein the second electrode strip in the first cholesteric liquid crystal cell is made of corrosion-resistant conductive material which comprises one or more of indium tin oxide, graphite, nickel-based alloys, titanium alloys, carbon fibers.

12. The display device according to claim 4, wherein the second electrode strip in the first cholesteric liquid crystal cell is made of corrosion-resistant conductive material which comprises one or more of indium tin oxide, graphite, nickel-based alloys, titanium alloys, carbon fibers.

13. The display device according to claim 5, wherein the second electrode strip in the first cholesteric liquid crystal cell is made of corrosion-resistant conductive material which comprises one or more of indium tin oxide, graphite, nickel-based alloys, titanium alloys, carbon fibers.

14. The display device according to claim 6, wherein the second electrode strip in the first cholesteric liquid crystal cell is made of corrosion-resistant conductive material which comprises one or more of indium tin oxide, graphite, nickel-based alloys, titanium alloys, carbon fibers.

15. The display device according to claim 7, wherein the second electrode strip in the first cholesteric liquid crystal cell is made of corrosion-resistant conductive material which comprises one or more of indium tin oxide, graphite, nickel-based alloys, titanium alloys, carbon fibers.

16. The display device according to claim 8, wherein the second electrode strip in the first cholesteric liquid crystal cell is made of corrosion-resistant conductive material which comprises one or more of indium tin oxide, graphite, nickel-based alloys, titanium alloys, carbon fibers.

* * * * *